US010024412B2

(12) United States Patent
Kreß et al.

(10) Patent No.: US 10,024,412 B2
(45) Date of Patent: Jul. 17, 2018

(54) TRANSMISSION DEVICE WITH SECONDARILY COUPLED POWER SPLIT

(71) Applicant: ZF Friedrichshafen AG, Friedrichshafen (DE)

(72) Inventors: Tobias Kreß, Oberbayern (DE); Jürgen Pohlenz, Ravensburg (DE); Christian Herrmann, Friedrichshafen (DE); Erwin Baur, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 400 days.

(21) Appl. No.: 14/868,479

(22) Filed: Sep. 29, 2015

(65) Prior Publication Data

US 2016/0097442 A1    Apr. 7, 2016

(30) Foreign Application Priority Data

Oct. 2, 2014    (DE) .................. 10 2014 220 028

(51) Int. Cl.
*F16H 47/04*    (2006.01)
*F16H 47/02*    (2006.01)
*F16H 37/08*    (2006.01)

(52) U.S. Cl.
CPC ............ *F16H 47/02* (2013.01); *F16H 47/04* (2013.01); *F16H 2037/0886* (2013.01); *F16H 2047/025* (2013.01); *F16H 2047/045* (2013.01); *F16H 2200/0034* (2013.01);
(Continued)

(58) Field of Classification Search
CPC .................................................. F16H 47/04
See application file for complete search history.

(56) References Cited

U.S. PATENT DOCUMENTS 5,584,772 A * 12/1996 Hayd .................... B60K 17/06
475/72
8,460,147 B2    6/2013 Legner

FOREIGN PATENT DOCUMENTS

DE    102009001603 A1    9/2010
DE    102010040744 A1    3/2012
(Continued)

OTHER PUBLICATIONS

German Search Report issued in corresponding German Application No. 10 2014 220 028.8 dated Feb. 16, 2016.

*Primary Examiner* — Derek D Knight
(74) *Attorney, Agent, or Firm* — Davis & Bujold PLLC; Michael J. Bujold

(57) ABSTRACT

A transmission device with secondarily coupled power splitting, having hydrostatic and mechanical branches which can be summed by a summing gear system provided in the area of a central transmission shaft. At least two transmission ratio ranges, in the forward and reverse driving directions, can be obtained such that within the transmission ratio ranges the transmission ratio can, in each case, be varied continuously by a hydrostatic variator in the area of the hydrostatic branch. On the transmission input side, the central transmission shaft can directly couple a drive engine and functionally connect to both an auxiliary drive output shaft and a hydrostatic shaft of the variator, in the form of countershafts, and also to hydraulic pumps in the area of the transmission input. In the area of the transmission output, the central transmission shaft is coupled to a further hydrostatic shaft in the form of a countershaft.

14 Claims, 3 Drawing Sheets

(52) U.S. Cl.
CPC ............... *F16H 2200/0086* (2013.01); *F16H 2200/2012* (2013.01); *F16H 2200/2043* (2013.01)

(56) References Cited

FOREIGN PATENT DOCUMENTS

DE     10 2012 216 046 A1     4/2014
EP             2860426 A1     4/2015

\* cited by examiner

TRANSMISSION DEVICE WITH SECONDARILY COUPLED POWER SPLIT

This application claims priority from German patent application serial no. 10 2014 220 028.8 filed Oct. 2, 2014.

FIELD OF THE INVENTION

The invention concerns a transmission device with secondarily coupled power splitting.

BACKGROUND OF THE INVENTION

A drive-train of an agricultural or municipal vehicle such as a tractor with a step-up gear unit is known from DE 10 2012 216 046 A1. On the drive input side, the step-up gear unit is connected to a drive engine such as an internal combustion engine, and is designed with secondarily coupled power splitting with a hydrostatic branch and a mechanical branch, such that the two branches can be summed by a summing gear system. In addition at least two transmission ratio ranges in the forward and reverse directions can be obtained, wherein the transmission ratio of the step-up gear unit within the transmission ratio ranges can in each case be continuously varied by means of a hydrostatic variator in the area of the hydrostatic branch. Furthermore, in the area of an auxiliary drive output shaft configured as a countershaft, the step-up gear unit is coupled on the transmission input side to the drive engine. The auxiliary drive output shaft is connected by way of gearwheel pairs to a central transmission shaft and to hydraulic pumps and to a hydrostatic shaft also configured as a countershaft.

Owing to the high power to be provided in each case during operation by the auxiliary drive output shaft to various devices, besides the central transmission shaft by way of which the power flow for driving operation is transmitted the auxiliary drive output shaft too has to be made with correspondingly large dimensions, so that the weight of the step-up gear unit is large and its production costs are undesirably high.

SUMMARY OF THE INVENTION

Accordingly, the purpose of the present invention is to provide an inexpensive transmission device characterized by lower inherent weight.

According to the invention, that objective is achieved by a transmission device having the characteristics as described below.

In the transmission device according to the invention with secondarily coupled power splitting, which has a hydrostatic branch and a mechanical branch, the hydrostatic and mechanical branches can be summed by a summing gear system provided in the area of a central transmission shaft. Furthermore, with the transmission device at least two transmission ratio ranges in the forward direction and in the reverse driving direction can be obtained, and the transmission ratios of the transmission device can in each case be continuously varied within the transmission ratio ranges by means of a hydrostatic variator in the area of the hydrostatic branch.

According to the invention, on the transmission input side the central transmission shaft can be coupled to a drive engine of a drive-train of a preferably articulated utility vehicle and is functionally connected to an auxiliary drive output shaft in the form of a countershaft, to a hydrostatic shaft of the variator in the form of a countershaft and also to hydraulic pumps in the area of the transmission input, while in the area of the transmission output the central transmission shaft is coupled to a further hydrostatic shaft in the form of a countershaft.

Since the central transmission shaft can be coupled directly to the drive engine and in the area of the transmission input the power flow of the transmission is already split in the direction of the auxiliary drive output or power take-off shaft, in the direction of the hydraulic pumps or working hydraulic pumps and also in the direction of the drive input, compared with the solution known from the prior art the auxiliary drive output shaft is acted upon during operation with a smaller torque and the transmission device can therefore be made smaller and thus lighter and less costly.

In addition all the working hydraulic pumps can be positioned in the area of the transmission input, so that structural space available in an articulated utility vehicle on the side of the transmission device facing away from the articulation joint can be used in a simple manner for the arrangement of the working hydraulic pumps.

Furthermore, the splitting of the power flow in the area of the transmission input, in the direction toward the working hydraulic pumps, the auxiliary drive output shaft or power take-off shaft and the drive input, provides the possibility, during so-termed PTO (Power-Take-Off) operation via the auxiliary drive output shaft, to obtain so-termed boost operation during which, if necessary with the full driving torque available from the drive engine, a desired large auxiliary drive output torque can be obtained, which corresponds for example to twice the drive input torque.

In addition, in a simple and space-saving manner the transmission device according to the invention provides the possibility of driving gearwheels connected to the hydraulic pumps and the auxiliary drive output shaft by means of a centrally arranged gearwheel on the transmission input side.

In a simply designed embodiment of the transmission device according to the invention, the central transmission shaft is functionally connected respectively to the auxiliary drive output shaft and to the driveshafts of the hydraulic pumps by way of a fixed wheel and gearwheels connected rotationally fixed to the shafts in the area of the transmission input.

In a simple-to-assemble embodiment of the transmission device according to the invention, the central transmission shaft is coupled on the transmission output side to the hydrostatic shaft by way of a fixed wheel, an intermediate wheel that meshes with it and a fixed wheel on the hydrostatic shaft.

If in an area facing toward the transmission input the further hydrostatic shaft is connected to a shaft of the summing gear system made as a planetary gearset, the transmission device is characterized by high power density.

In an embodiment of the transmission device according to the invention that can be operated with high efficiency, a hydrostatic unit designed as a constant oblique-axis unit is made smaller than a hydrostatic unit designed as an adjustable oblique-axis unit. This design is based upon the knowledge that in the area of oblique-axis units, lower power losses occur and a hydrostatic variator, particularly with a constant oblique-axis unit with correspondingly small dimensions, can be operated with high efficiency. To be able to compensate for the high rotation speeds that result in the area of the smaller constant oblique-axis unit, respective gearwheel pairs that have to be engaged between a transmission output and the hydrostatic shafts associated with the constant oblique-axis unit must be appropriately adapted as necessary.

BRIEF DESCRIPTION OF THE DRAWINGS

Further advantages and advantageous further developments of the invention emerge from the example embodiment whose principle is described with reference to the drawings, which show.

DETAILED DESCRIPTION OF THE PREFERRED EMBODIMENTS

Figure 1:
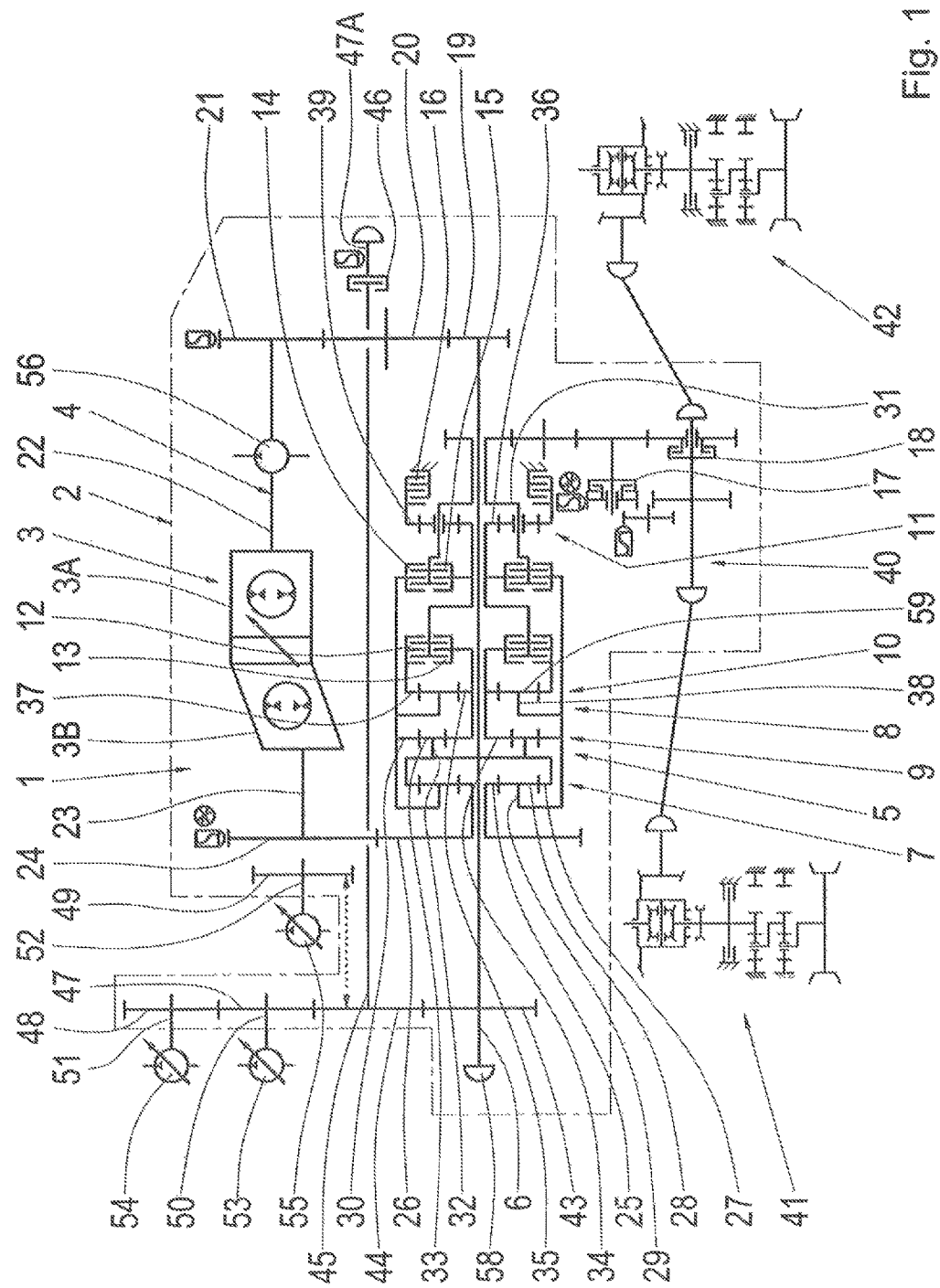
FIG. 1: A schematic representation of a drive-train of an articulated utility vehicle, with a preferred embodiment of the transmission device according to the invention.

FIG. 1 shows a vehicle drive-train 1 with a transmission device 2 of a vehicle, preferably in the form of an articulated utility vehicle. A hydrostatic variator 3 is provided for the continuous variation of a transmission ratio of the transmission device 2. The transmission device 2 is designed with secondary power splitting and with a hydrostatic branch 4 containing the variator 3 and a mechanical branch 5, which can be summed by means of a summing gear system 7, which is provided in the area of a central transmission shaft 6 and designed as a planetary gearset. In the transmission device 2 in each case four transmission ratio ranges in the forward and reverse driving directions can be obtained, and in each case the transmission ratio within the ratio ranges can be varied continuously by means of the hydrostatic variator 3.

The variator 3 comprises a hydrostatic unit 3A in the form of a variable-displacement pump with two delivery directions as a swash-plate unit, and also a further, reversible hydrostatic unit 3B in the form of a constant oblique-axis unit, which has smaller dimensions than the hydrostatic unit 3A, the hydrostatic units being used both as pumps and as motors.

Next to the planetary gearset 7 on the central transmission shaft 6 is located a change-speed transmission which, in addition to the planetary gearset 7 comprises three further planetary gearsets 9 to 11, whose shafts can be coupled to one another by means of five frictional shifting elements 12 to 16 in the manner described in detail later, in order to obtain the four transmission ratio ranges, all the shafts being arranged coaxially on the central transmission shaft 6. On the transmission output side of the change-speed transmission 8 two further frictional shifting elements 17, 18 are provided, such that when the frictional shifting element 17 is closed the vehicle can be driven in the forward direction whereas when the frictional shifting element 18 is closed a vehicle made with the vehicle drive-train 1 and the transmission device 2 can be driven in reverse.

Furthermore, by way of a fixed wheel 19, an intermediate wheel 20 and a fixed wheel 21 of a hydrostatic shaft 22 configured as a countershaft that mesh together, the central transmission shaft 6 is functionally connected to the variator 3 or first hydrostatic unit 3A. A further hydrostatic shaft 23 of the hydrostat 3 is also made with a fixed wheel 24, which meshes with a gearwheel 26 connected in a rotationally fixed manner to a shaft 25, formed as a sun gear, of the planetary gearset 7.

The central transmission shaft 6 is coupled in a rotationally fixed manner to a shaft 27 of the planetary gearset 7 made as a ring gear, which, like the sun gear 25, meshes with planetary gearwheels 28 of the planetary gearset 7 which in turn are mounted to rotate on a planetary carrier 29. The planetary carrier 29 of the planetary gearset 7 is connected in a rotationally fixed manner to a shaft 30 of the planetary gearset 9 in the form of a ring gear, and by means of the frictional shifting element 14 can be connected rotationally fixed to a shaft 31 of the planetary gearset 11 which forms a planetary carrier.

The ring gear 27 of the planetary gearset 7 is in turn connected in a rotationally fixed manner to a shaft 32 of the planetary gearset 9 in the form of a planetary carrier, on which planetary gearwheels 33 are mounted to rotate, these gearwheels 33 meshing with the ring gear 30 and with a shaft 34 of the planetary gearset 9 formed as its sun gear. The sun gear 34 of the planetary gearset 9 is connected in a rotationally fixed manner to a shaft 35 of the planetary gearset 10 also in the form of a sun gear, and can be brought by means of the frictional shifting element 13 into rotationally fixed functional connection with a shaft 36 of the planetary gearset 11 which is again in the form of a sun gear.

A ring gear or rather shaft 37 of the planetary gearset 10 can be coupled by means of the frictional shifting element 12 to the sun gear 36 of the planetary gearset 11, and meshes with planetary gearwheels 59 mounted to rotate on a shaft 38 of the planetary gearset 10 in the form of a planetary carrier, the gearwheels 59 in turn being engaged with the sun gear 35. The planetary carrier 38 of the planetary gearset 10 is in turn connected in a rotationally fixed manner to the ring gear 30 of the planetary gearset 9 and therefore, again by virtue of the frictional shifting element 14, can be brought into functional connection with the planetary carrier 31 of the planetary gearset 11. A shaft 39 in the form of a ring gear of the planetary gearset 11 can be rotationally fixed by means of the frictional shifting element 16, which is designed as a brake. The planetary carrier 31 can be coupled by means of the frictional shifting elements 17 and 18 to a transmission output 40 which is functionally connected to a front axle 41 and a rear axle 42.

On the transmission input side the central transmission shaft 6 has a further fixed wheel 43, which meshes with a fixed wheel 44 of an auxiliary drive output shaft 45 in the form of a countershaft. The auxiliary drive output shaft 45 can be coupled in the area of a further frictional shifting element 46 to a drive input shaft 47A, by means of which auxiliary drive outputs of the vehicle built with the vehicle drive-train 1 can be driven.

In addition, further gearwheels 47, 48 and 49 also mesh with the fixed wheel 44, these gearwheels being connected in a rotationally fixed manner to drive input shafts 50 to 52 of hydraulic pumps 53 to 55. In the present case, the hydraulic pumps 53 to 55 are designed as load-sensing pumps and are provided as the hydraulic supply of the vehicle built with the vehicle drive-train 1. A further hydraulic pump 56 arranged on the hydrostatic shaft 23 is designed as an internal gear pump and constitutes a system pressure pump for supplying transmission oil to the transmission device 2.

Figure 2:
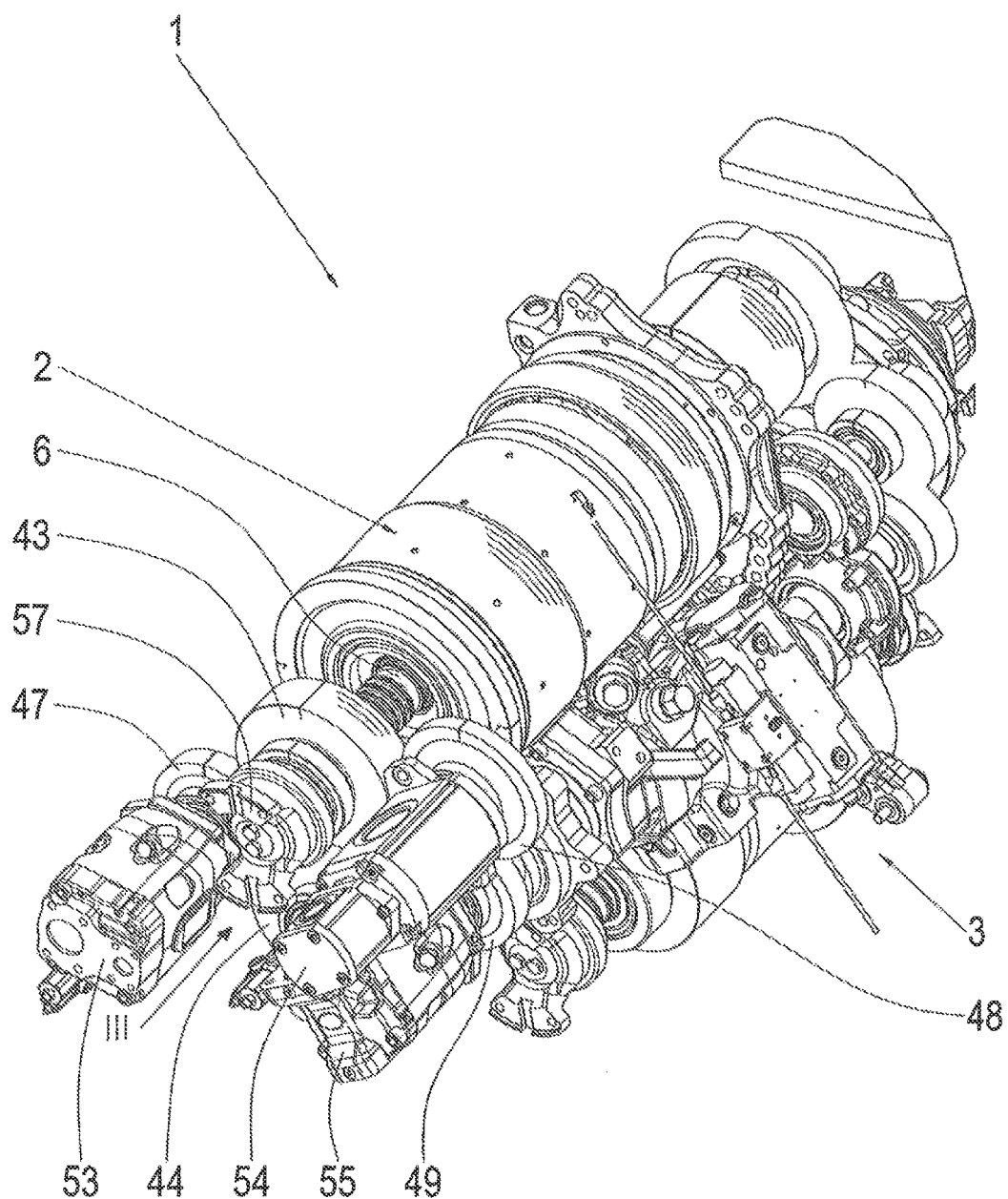
FIG. 2: A simplified, three-dimensional partial view of the drive-train in FIG. 1.
Figure 3:
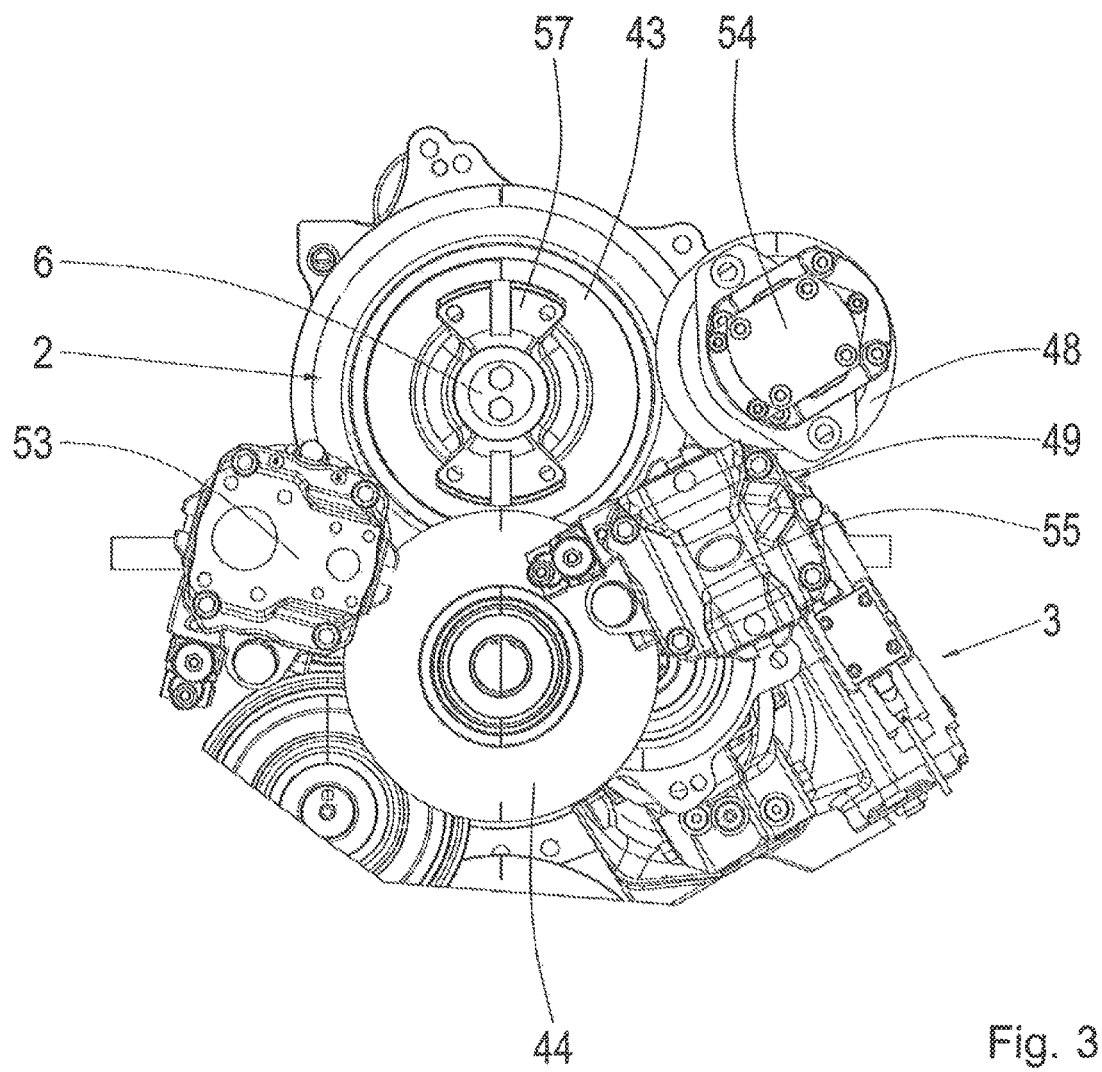
FIG. 3: A view of the transmission device of FIG. 1, shown from a point of view marked III in FIG. 2.

As shown in FIGS. 2 and 3 the hydraulic pumps 53 to 56 are arranged in a space-saving manner in the area of the transmission input of the transmission device 2, disposed around the central transmission shaft 6, which can be brought into direct functional connection by way of a drive input flange 57 with a drive engine 58, preferably a diesel internal combustion engine.

To obtain a first transmission ratio range for forward driving or for reverse driving, the frictional shifting elements 12 and 16 must be in their closed operating conditions, while the other frictional shifting elements 13, 14 and 15 have to be open. If a corresponding shift starting from the first transmission ratio range to the second transmission ratio range is required, the frictional shifting element 12 must be opened and the frictional shifting element 13 closed, while the frictional shifting element 16 remains closed and the shifting elements 14 and 15 remain open.

Starting from the second transmission ratio range, if a shift to the third transmission ratio range is required the frictional shifting element 16 must be opened and the frictional shifting element 14 closed, while for a shift from the third transmission ratio range to the fourth transmission ratio range the frictional shifting element 14 must be opened and the further shifting element 15, at the same time as the frictional shifting element 13 is closed, must be changed to its closed operating condition.

INDEXES

1 Vehicle drive-train
2 Transmission device
3 Variator
3A, 3B Hydrostatic unit
4 Hydrostatic branch
5 Mechanical branch
6 Central transmission shaft
7 Summing gear system, planetary gearset
8 Change-speed transmission
9 to 11 Planetary gearset
12 to 18 Frictional shifting element
17, 18 Frictional shifting element
19 Fixed wheel
20 Intermediate wheel
21 Fixed wheel
22, 23 Hydrostatic shaft
24 Fixed wheel
25 Shaft, sun gear of the planetary gearset 7
26 Gearwheel
27 Shaft, ring gear of the planetary gearset 7
28 Planetary gearwheels of the planetary gearset 7
29 Planetary carrier of the planetary gearset 7
30 Shaft, ring gear of the planetary gearset 9
31 Shaft, planetary carrier of the planetary gearset 11
32 Shaft, planetary carrier of the planetary gearset 9
33 Planetary gearwheels of the planetary gearset 9
34 Shaft, sun gear of the planetary gearset 9
35 Shaft, sun gear of the planetary gearset 10
36 Shaft, sun gear of the planetary gearset 11
37 Shaft, ring gear of the planetary gearset 10
38 Shaft, planetary carrier of the planetary gearset 10
39 Shaft, ring gear of the planetary gearset 11
40 Transmission output
41 Front axle
42 Rear axle
43 Fixed wheel of the central transmission shaft
44 Fixed wheel of the auxiliary drive output shaft
45 Auxiliary drive output shaft
46 Further frictional shifting element
47A Drive input shaft
47 to 49 Gearwheel
50 to 52 Drive input shaft
53 to 56 Hydraulic pump
57 Drive input flange
58 Drive engine
59 Planetary gearwheels of the planetary gearset 10

The invention claimed is:

1. A transmission device (2) with secondarily coupled power splitting, the transmission device (2) comprising:
a hydrostatic branch (4) and a mechanical branch (5) which are summed by a summing gear system (7) provided in an area of a central transmission shaft (6), and
at least two transmission ratio ranges in forward and in reverse driving directions such that, within the at least two transmission ratio ranges, the transmission ratio, in each case, being continuously variable by a hydrostatic variator (3) in an area of the hydrostatic branch (4),
the central transmission shaft (6), on a transmission input side, being directly coupled to a drive engine (58) and the transmission input side of the central transmission shaft (6) being functionally connected for rotationally driving both an auxiliary drive output shaft (45), in a form of a countershaft, and also hydraulic pumps (53 to 55) in an area of the transmission input side of the central transmission shaft (6), and are output side of the central transmission shaft (6) rotationally driving an input hydrostatic shaft (22) of the hydrostatic variator (3), in a form of another countershaft,
an output hydrostatic shaft (23) of the hydrostatic variator (3), in a form of a further countershaft being coupled to the mechanical branch (5) for supplying a hydrostatic input thereto; and
the transmission device (2) having a transmission output (40).

2. The transmission device according to claim 1, wherein the central transmission shaft (6) is, in the area of the transmission input, functionally connected, by way of an drive output fixed wheel (43), respectively with the auxiliary drive output shaft (45) and with input gearwheels (44, 47 to 49) connected, in a rotationally fixed manner, to respective drive input shafts (50 to 52) of the hydraulic pumps (53 to 55).

3. The transmission device according to claim 1, wherein the central transmission shaft (6) is connected to the input hydrostatic shaft (22), on a transmission output side, by way of a central shaft fixed wheel (19), and the central shaft fixed wheel (19) meshes with an intermediate wheel (20) that meshes with a first further hydrostatic shaft fixed wheel (21) of the input hydrostatic shaft (22).

4. The transmission device according to claim 1, wherein the output hydrostatic shaft (23) is connected, in an area facing toward the transmission input, by way of a second further hydrostatic shaft fixed wheel (24) to a summing shaft (25) of the summing gear system (7) in a form of a planetary gearset.

5. The transmission device according to claim 1, wherein the hydrostatic variator (3) comprises first and second hydrostatic units (3A, 3B), and the first hydrostatic unit (3A) is an adjustable swash-plate unit and the second hydrostatic unit (3B) is a constant oblique-axis unit that has smaller dimensions that the first hydrostatic unit (3A).

6. A transmission device (2) with secondarily coupled power splitting, the transmission device comprising:
a hydrostatic branch (4) and a mechanical branch (5) which can be summed together by a summing gear system (7) provided in an area of a central transmission shaft (6),
at least two forward drive transmission ratio ranges for driving in a forward direction and at least two reverse drive transmission ratio ranges for driving in a reverse direction so that, within each of the at least two forward drive transmission ratio ranges and the at least two reverse drive transmission ratio ranges, a transmission ratio being continuously variable by a hydrostatic variator (3) of the hydrostatic branch (4), the central transmission shaft (6) having a transmission input side that is directly connectable to a drive engine (58), and the central transmission shaft (6) being functionally connected for rotationally driving both an auxiliary drive output shaft (45), which is a first countershaft, and also a plurality of hydraulic pumps (53 to 55) in an area of a transmission input side, wherein the hydraulic pumps (53 to 55) are disposed around the central transmissions shaft (6), which can be brought into direct functional connection by way of a drive input flange (57) with the drive engine (58), and an output side of the central transmission shaft (6) rotationally driving an input hydrostatic shaft (22) of the hydrostatic variator (3), in a form of second countershaft, and an output hydrostatic shaft (23) of the hydrostatic variator (3), which is a third countershaft, being coupled to the mechanical branch (5) for supplying hydrostatic input thereto.

7. The transmission device according to claim 6, wherein the central transmission shaft (6) is, in the area of the transmission input, functionally connected, by way of an drive output fixed wheel (43), respectively with the auxiliary drive output shaft (45) and with input gearwheels (44, 47 to 49) connected, in a rotationally fixed manner, to respective drive input shafts (50 to 52) of the hydraulic pumps (53 to 55).

8. The transmission device according to claim 6, wherein the central transmission shaft (6) is connected to the input hydrostatic shaft (22), on a transmission output side, by way of a central shaft fixed wheel (19), and the central shaft fixed wheel (19) meshes with an intermediate wheel (20) that meshes with a first further hydrostatic shaft fixed wheel (21) of the input hydrostatic shaft (22).

9. The transmission device according to claim 6, wherein the output hydrostatic shaft (23) is connected, in an area facing toward the transmission input, by way of a second further hydrostatic shaft fixed wheel (24) to a summing shaft (25) of the summing gear system (7) in a form of a planetary gearset.

10. The transmission device according to claim 6, wherein the hydrostatic variator (3) comprises first and second hydrostatic units (3A, 3B), and the first hydrostatic unit (3A) is an adjustable swash-plate unit and the second hydrostatic unit (3B) is a constant oblique-axis unit that has smaller dimensions that the first hydrostatic unit (3A).

11. A transmission device (2) with secondarily coupled power splitting, the transmission device (2) comprising:

a hydrostatic branch (4) and a mechanical branch (5) which are summed by a summing gear system (7) provided in an area of a central transmission shaft (6), and at least two transmission ratio ranges in forward and in reverse driving directions such that, within the at least two transmission ratio ranges, the transmission ratio, in each case, being continuously variable by a variator (3) in an area of the hydrostatic branch (4), the central transmission shaft (6), on a transmission input side, being directly coupled to a drive engine (58) and the transmission input side of the central transmission shaft (6) being functionally connected for rotationally driving both an auxiliary drive output shaft (45), in a form of a countershaft, and also hydraulic pumps (53 to 55) in an area of the transmission input side of the central transmission shaft (6), and an output side of the central transmission shaft (6) rotationally driving an input hydrostatic shaft (22) of the variator (3), in a form of another countershaft, wherein the central transmission shaft (6) is connected to the input hydrostatic shaft (22), on a transmission output side, by way of a central shaft fixed wheel (19), and the central shaft fixed wheel (19) meshing with an intermediate wheel (20) that meshes with a first further hydrostatic shaft fixed wheel (21) of the input hydrostatic shaft (22), an output hydrostatic shaft (23) of the variator (3), in a form of a further countershaft, being coupled to the mechanical branch (5) for supplying a hydrostatic input thereto; and the transmission device (2) having a transmission output (40).

12. The transmission device according to claim 11, wherein the central transmission shaft (6) is, in the area of the transmission input, functionally connected, by way of an drive output fixed wheel (43), respectively with the auxiliary drive output shaft (45) and with input gearwheels (44, 47 to 49) connected, in a rotationally fixed manner, to respective drive input shafts (50 to 52) of the hydraulic pumps (53 to 55).

13. The transmission device according to claim 11, wherein the output hydrostatic shaft (23) is connected, in an area facing toward the transmission input, by way of a second further hydrostatic shaft fixed wheel (24) to a summing shaft (25) of the summing gear system (7) in a form of a planetary gearset.

14. The transmission device according to claim 11, wherein the variator (3) comprises first and second hydrostatic units (3A, 3B), and the first hydrostatic unit (3A) is an adjustable awash-plate unit and the second hydrostatic unit (3B) is a constant oblique-axis unit that has smaller dimensions that the first hydrostatic unit (3A).

* * * * *